US008755452B2

(12) United States Patent
Levy

(10) Patent No.: US 8,755,452 B2
(45) Date of Patent: Jun. 17, 2014

(54) METHOD AND APPARATUS TO SELECT CODING MODE

(75) Inventor: Shmuel Levy, Qiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 43 days.

(21) Appl. No.: 13/089,043

(22) Filed: Apr. 18, 2011

(65) Prior Publication Data
US 2011/0194640 A1 Aug. 11, 2011

Related U.S. Application Data

(63) Continuation of application No. 12/542,949, filed on Aug. 18, 2009, now Pat. No. 7,929,634, which is a continuation of application No. 10/822,829, filed on Apr. 13, 2004, now Pat. No. 7,684,507.

(51) Int. Cl.
*H04B 7/02* (2006.01)

(52) U.S. Cl.
USPC .......................... 375/267; 370/208; 375/260

(58) Field of Classification Search
USPC ............ 375/267, 299, 347; 455/69, 101, 272
See application file for complete search history.

(56) References Cited

U.S. PATENT DOCUMENTS

| 6,131,016 | A | 10/2000 | Greenstein et al. | |
|---|---|---|---|---|
| 6,298,092 | B1 | 10/2001 | Heath, Jr. et al. | |
| 6,862,440 | B2 | 3/2005 | Sampath | |
| 6,873,606 | B2 | 3/2005 | Agrawal et al. | |
| 6,985,434 | B2 | 1/2006 | Wu et al. | |
| 7,684,507 | B2 | 3/2010 | Levy | |
| 7,929,634 | B2 | 4/2011 | Levy | |
| 2002/0055356 | A1 | 5/2002 | Dulin et al. | |
| 2002/0122383 | A1 | 9/2002 | Wu et al. | |
| 2002/0193146 | A1 | 12/2002 | Wallace et al. | |
| 2003/0021353 | A1* | 1/2003 | Hiramatsu et al. | 375/267 |
| 2003/0035491 | A1* | 2/2003 | Walton et al. | 375/267 |
| 2004/0071118 | A1 | 4/2004 | Dabak et al. | |
| 2004/0132496 | A1* | 7/2004 | Kim et al. | 455/562.1 |
| 2004/0162021 | A1 | 8/2004 | Seki et al. | |
| 2005/0041622 | A1* | 2/2005 | Dubuc et al. | 370/332 |
| 2005/0041693 | A1 | 2/2005 | Priotti | |
| 2005/0078763 | A1* | 4/2005 | Choi et al. | 375/267 |
| 2005/0157679 | A1 | 7/2005 | Dulin et al. | |
| 2005/0226343 | A1 | 10/2005 | Levy | |
| 2006/0193268 | A1* | 8/2006 | Walton et al. | 370/264 |

(Continued)

FOREIGN PATENT DOCUMENTS

| EP | 1126647 A1 | 8/2001 |
|---|---|---|
| EP | 1398882 A1 | 3/2004 |

(Continued)

OTHER PUBLICATIONS

Office Action of Taiwanese Application No. 094109287 dated May 11, 2009, 15 Pages of Tiwanese Office Action.

(Continued)

*Primary Examiner* — Leon-Viet Nguyen
(74) *Attorney, Agent, or Firm* — Schwegman, Lundberg & Woessner, P.A.

(57) ABSTRACT

An apparatus and method that may select a coding mode of an OFDM sub-carrier symbol stream between a diversity mode or a multiplexing mode according to information received in a wireless network.

22 Claims, 2 Drawing Sheets

(56) References Cited

U.S. PATENT DOCUMENTS

| | | | |
|---|---|---|---|
| 2008/0285670 A1* | 11/2008 | Walton et al. | 375/260 |
| 2009/0304105 A1 | 12/2009 | Levy | |
| 2009/0304106 A1 | 12/2009 | Levy | |

FOREIGN PATENT DOCUMENTS

| | | |
|---|---|---|
| TW | 421928 A1 | 2/2001 |
| TW | 510103 A1 | 11/2002 |
| TW | 525362 A1 | 3/2003 |
| TW | 200400710 A1 | 1/2004 |
| TW | 576034 A1 | 2/2004 |
| WO | 02/091625 A1 | 11/2002 |
| WO | WO-2005104419 A1 | 11/2005 |

OTHER PUBLICATIONS

Heath et al. "Switching between multiplexing and diversity based on constellation distance". Proceedings, Allerton Conference on Communications, Control,constellation distance, Proceedings, Allerton Conference on Communications, Control,and Computing, pp. 212-221, Sep. 2000.

Zheng et al."Diversity and multiplexing": A fundamental trade-off in multipleantenna channels, IEEE Transactions on Information Theory, vol. 49 Issue (5), dated May 5, 2003, 27 Pages.

Andrews et al."Fundamentals of WiMAX: Fundamentals of WiMAX:Understanding Broadband Wireless Networking, pp. 190-197, Prentice Hall,2007."

International Search Report and Written Opinion received for PCT Patent Application No. PCT/US2005/009350, mailed on Oct. 26, 2006, 8 pages.

"High-Throughput Wireless LAN Air Interface", Intel Technology Journal; vol. 7, Issue 3. Aug. 19, 2003. pp. 47-57.

Office Action received for Malaysian Patent Application No. 20051323, mailed on Jul. 18, 2008, 4 pages of Malaysian Office Action.

Office Action received for Chinese Patent Application No. 200580017842.7, mailed on Apr. 3, 2009, 4 pages of English Translation and 11 pages of Office Action.

Office Action received for Chinese Patent Application No. 200580017842.7, mailed on May 5, 2010, 7 pages of English Translation and 8 pages of Office Action.

Office Action received for Chinese Patent Application No. 200580017842.7, mailed on Sep. 13, 2010, 6 pages of English Translation and 8 pages of Office Action.

"U.S. Appl. No. 10/822,829, Advisory Action mailed Aug. 19, 2009", 3 pgs.

"U.S. Appl. No. 10/822,829, Advisory Action mailed Oct. 6, 2008", 3 pgs.

"U.S. Appl. No. 10/822,829, Examiner Interview Summary mailed Feb. 18, 2009", 2 pgs.

"U.S. Appl. No. 10/822,829, Examiner Interview Summary mailed Oct. 20, 2009", 3 pgs.

"U.S. Appl. No. 10/822,829, Final Office Action mailed Jun. 8, 2009", 15 pgs.

"U.S. Appl. No. 10/822,829, Final Office Action mailed Aug. 4, 2008", 21 pgs.

"U.S. Appl. No. 10/822,829, Final Office Action mailed Sep. 19, 2007", 22 pgs.

"U.S. Appl. No. 10/822,829, Non Final Office Action mailed Jan. 17, 2008", 18 pgs.

"U.S. Appl. No. 10/822,829, Non Final Office Action mailed May 3, 2007", 16 pgs.

"U.S. Appl. No. 10/822,829, Non Final Office Action mailed Nov. 12, 2008", 15 pgs.

"U.S. Appl. No. 10/822,829, Notice of Allowance mailed Dec. 8, 2009", 4 pgs.

"U.S. Appl. No. 10/822,829, Response filed Mar. 9, 2009 to Non Final Office Action mailed Nov. 12, 2008", 12 pgs.

"U.S. Appl. No. 10/822,829, Response filed Apr. 17, 2008 to Non Final Office Action mailed Jan. 17, 2008", 11 pgs.

"U.S. Appl. No. 10/822,829, Response filed Aug. 2, 2007 to Non Final Office Action mailed May 3, 2007", 12 pgs.

"U.S. Appl. No. 10/822,829, Response filed Aug. 10, 2009 to Final Office Action mailed Jun. 8, 2009", 11 pgs.

"U.S. Appl. No. 10/822,829, Response filed Sep. 25, 2008 to Final Office Action mailed Aug. 4, 2008", 11 pgs.

"U.S. Appl. No. 10/822,829, Response filed Dec. 19, 2007 to Final Office Action mailed Sep. 19, 2007", 13 pgs.

"U.S. Appl. No. 10/822,829, Supplemental Response filed Nov. 6, 2009 to Final Office Action mailed Jun. 8, 2009", 9 pgs.

"U.S. Appl. No. 12/542,941, Response filed Apr. 11, 2012 to Non Final Office Action mailed Oct. 13, 2011", 9 pgs.

"U.S. Appl. No. 12/542,941, Final Office Action mailed Oct. 4, 2012", 5 pgs.

"U.S. Appl. No. 12/542,941, Non Final Office Action mailed Apr. 21, 2011", 16 pgs.

"U.S. Appl. No. 12/542,941, Non Final Office Action mailed Jun. 7, 2012", 11 pgs.

"U.S. Appl. No. 12/542,941, Non Final Office Action mailed Oct. 13, 2011", 12 pgs.

"U.S. Appl. No. 12/542,941, Response filed on Jul. 11, 2011 to Non Final Office Action mailed Apr. 21, 2011", 13 pp.

"U.S. Appl. No. 12/542,941, Response filed on Aug. 30, 2012 to Non Final Office Action mailed Jun. 7, 2012", 12 pp.

"U.S. Appl. No. 12/542,949, Non Final Office Action mailed Apr. 15, 2010", 16 pgs.

"U.S. Appl. No. 12/542,949, Notice of Allowance mailed Dec. 20, 2010", 4 pgs.

"U.S. Appl. No. 12/542,949, Response filed Aug. 16, 2010 to Non Final Office Action mailed Apr. 15, 2010", 9 pgs.

"Chinese Application Serial No. 200580017842.7, Decision on Rejection mailed Sep. 13, 2010", 14 pgs.

"Chinese Application Serial No. 200580017842.7, First Office Action mailed Apr. 3, 2009", 8 pgs.

"Chinese Application Serial No. 200580017842.7, Notice on Reexamination mailed May 31, 2012", 17 pgs.

"Chinese Application Serial No. 200580017842.7, Response filed Jul. 20, 2010 to Second Office Action mailed Jun. 2, 2010", 1 pg.

"Chinese Application Serial No. 200580017842.7, Response filed Oct. 9, 2009 to First Office Action mailed May 25, 2009", 1 pg.

"Chinese Application Serial No. 200580017842.7, Response filed Jul. 9, 2012 to Office Action mailed May 31, 2012", 9 pgs.

"Chinese Application Serial No. 200580017842.7, Second Office Action mailed Jun. 2, 2010", 16 pgs.

"International Application Serial No. PCT/US2005/009350, International Preliminary Report on Patentability mailed Oct. 19, 2006", 7 pgs.

"U.S. Appl. No. 12/542,941, Response filed Jan. 3, 2013 to Final Office Action mailed Oct. 4, 2012", 7 pgs.

* cited by examiner

METHOD AND APPARATUS TO SELECT CODING MODE

CROSS REFERENCE TO RELATED APPLICATIONS

This application claims priority from U.S. application Ser. No. 12/542,949, filed on Aug. 18, 2009, entitled "METHOD AND APPARATUS TO SELECT CODING MODE," now issued as U.S. Pat. No. 7,929,634, which claims priority from U.S. application Ser. No. 10/822,829, filed on Apr. 13, 2004, entitled "METHOD AND APPARATUS TO SELECT CODING MODE" now U.S. Pat. No. 7,684,507 issued on Mar. 23, 2010. The entire teachings of the above applications are incorporated herein by reference.

BACKGROUND OF THE INVENTION

In wireless communication systems, radio transmitters may transmit and/or receive radio frequency (RF) signals through one or more antennas. Some wireless communication devices may include multiple antennas, for example two or more antennas. Those wireless communication devices may include multiple-input-multiple-output (MIMO) modulation and/or coding to control receiving and transmitting of RF signals through the multiple antennas.

MIMO system may include a diversity MIMO system or multiplexing MIMO system. In the diversity MIMO system incoming bits may be coded over multiple transmitting antennas to gain sensitivity by exploiting multi path propagation channel property. In the multiplexing MIMO system the multiple transmitting antennas may be used to convey multiple modulated streams of data. In this MIMO system spatial decoding methods may be used to decode the modulated data streams.

A MIMO system may use orthogonal frequency division multiplexing (OFDM) systems coding for multiplexing or diversity evenly on the entire OFDM sub-carriers symbol without any discrimination. A failure to multiplex in at least some bits of the OFDM sub-carriers symbol may cause all bits of the OFSM sub-carriers symbol to be in error.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
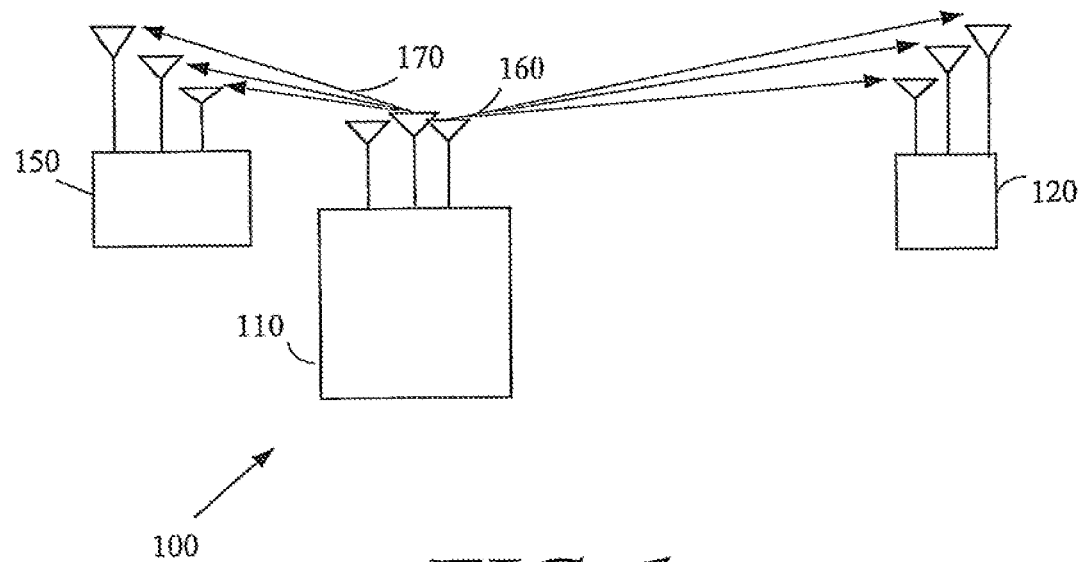
FIG. 1 is an illustration of a portion of a communication system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like. For example, "plurality of mobile stations" describes two or more mobile stations.

It should be understood that the present invention may be used in a variety of applications. Although the present invention is not limited in this respect, the circuits and techniques disclosed herein may be used in many apparatuses such as transmitters of a radio system. Transmitters intended to be included within the scope of the present invention may include, by way of example only, wireless transmitters including two-way radio transmitters, digital system transmitters, analog system transmitters, cellular radiotelephone transmitters and the like.

Types of wireless transmitters intended to be within the scope of the present invention include, although are not limited to, transmitters for transmitting spread spectrum signals such as, for example, Frequency Hopping Spread Spectrum (FHSS), Direct Sequence Spread Spectrum (DSSS) orthogonal frequency division multiplexing (OFDM) transmitters, MIMO transmitters, and the like.

Some embodiments of the invention may be implemented, for example, using a machine-readable medium or article which may store an instruction or a set of instructions that, if executed by a machine (for example, by a mobile station, and/or by other suitable machines), cause the machine to perform a method and/or operations in accordance with embodiments of the invention. Such machines may include, for example, any suitable processing platform, computing platform, computing device, processing device, computing system, processing system, computer, processor, or the like, and may be implemented using any suitable combination of hardware and/or software. The machine-readable medium or articles may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk or Digital Video Disks (DVDs) or other optical or magnetic media of various types. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language.

Turning to FIG. 1, a wireless communication system 100, in accordance with an exemplary embodiment of the invention, is shown. Although the scope of the present invention is not limited in this respect, network 100 may include one or more user stations 150, 120 and one or more network access stations 110, such as a base station or access point. According to embodiments of the invention, at least some of the user stations and network access stations, for example stations 120, 150 and 110 may include a multi antenna system having at least two antennas.

Although the scope of the present invention is not limited in this respect, at least one transmitter among transmitters of stations 120 and/or 150 and/or network station 110 may be configured to adaptively code a sub-carrier either in diversity mode or in the multiplexing mode according to the sub-carrier channel state information (CSI), if desired.

Figure 2:
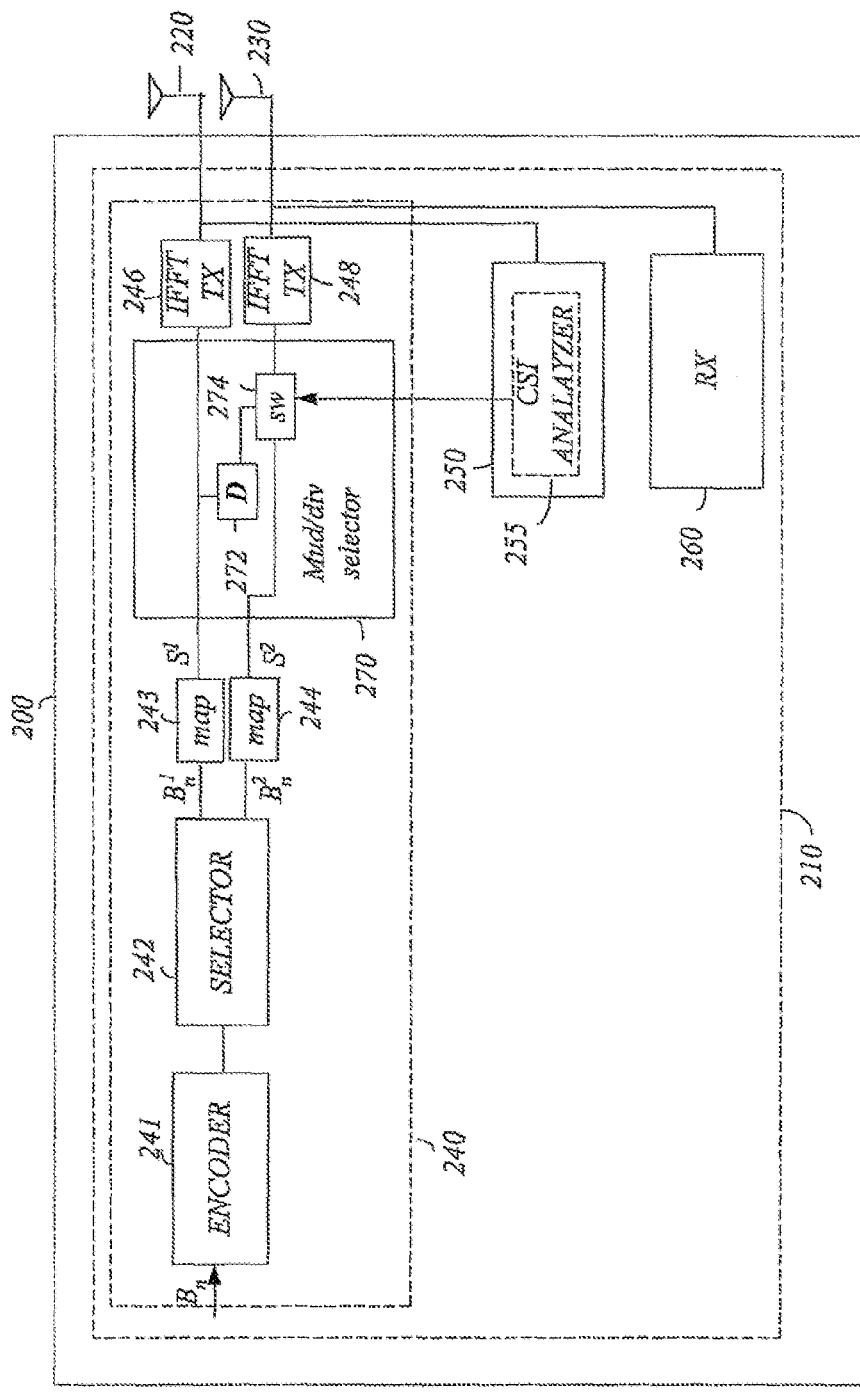
FIG. 2 is a block diagram of a transceiver according to exemplary embodiments of the present invention.

Turning to FIG. 2, a block diagram of a transceiver 200 according to exemplary embodiments of the present invention is shown. Although the scope of the present invention is not limited in this respect, transceiver 200 may include a multi antenna system 210 including antennas 220 and 230. Although the scope of the present invention is not limited in this respect, exemplary system 210 may include a transmitter system 240 and receivers (RX) 250, 260. In some embodiments of the invention, at least one of the receivers 250, 260 may include carrier channel state information (CSI) analyzer 255, if desired.

Although the scope of the present invention is not limited in this respect, transmitter system 240 may include an encoder 241, a selector 242, mappers 243, 244, a mode selector 270 and Inverse Fast Furrier Transformer transmitters (IFFT TX) 246, 248. In addition, mode selector 270 may include a delay (D) 272 and a switch (SW) 274, if desired.

Although the scope of the present invention is not limited in this respect, a data stream that may include two or more bits $B_n$ may be inputted to encoder 241. Although the scope of the present invention is not limited in this respect, encoder 241 may be a convolution code encoder, a Turbo encoder, a Low-Density Parity Check (LDPC) encoder, or the like. In embodiments of the invention encoder 241 may encode the data stream. The encoded data stream may be inputted to selector 242. In some embodiments of the invention selector 242 may provide at least two data streams $B^1_n$ and $B^2_n$ wherein the superscript number (e.g. 1, 2) may be the number of the data stream and the subscript number (e.g. n) may be the bit number of the data stream.

Although the scope of the present invention is not limited in this respect, mappers 243 and 244 may received the data streams $B^1_n$ and $B^2_n$, respectively, and may provide two or more OFDM sub-carriers, symbols $S^1$ and $S^2$, if desired. For example, in some embodiments of the invention mappers 243 and 244 may map OFDM sub-carriers symbols from binary domain to a complex domain. For example, symbol (e.g. encoded in rate ½) "00" may be mapped to 0° (e.g. 1+j*0), symbol "01" may be mapped to 90° (e.g. +j), symbol "10" may be mapped to 180° (e.g. −1+j*0) and symbol "11" may be mapped to 270° (e.g. 1−j).

Although the scope of the present invention is not limited in this respect, the OFDM sub-carriers symbols (e.g. $S^1$ and $S^2$) may be inputted to coding mode selector 270. In some embodiments of the invention, coding mode selector 270 may adaptively select a coding mode of the OFDM sub-carrier symbols according to CSI which relates to the OFDM sub-carrier. In those embodiments, coding mode selector 270 may adaptively code the OFDM sub-carrier either in diversity mode or in the multiplexing mode, if desired.

Although the scope of the present invention is not limited in this respect, in some embodiments of the invention, CSI may be received, for example, from network station 110, or from at least one of user stations 150 and/or 120. RX 250 may receive CSI and CSI analyzer 255 may analyze the received CSI. In addition, CSI analyzer 255 may alternate switch (SW) 274 to provide symbols with delay (e.g. diversity mode) or symbols from mapper 244 (e.g. multiplexing mode) to IFFT TX 248, if desired. In some embodiments of the invention, the analyzed information that may be, for example, Eigen-channel value, a signal to noise ratio (SNR) or the like. In other embodiments of the invention, CSI analyzer 255 may analyze the transmitted OFDM sub-carrier symbol for example, based on channel estimation and/or SNR of the estimated channel, if desired.

Although the scope of the present invention is not limited in this respect, CSI analyzer 255 of RX 250 and/or RX 260 may receive a modulated signal from at least one of the WLAN stations and may estimate the CSI according to the following function, if desired:

$$H^*H = \begin{bmatrix} h_{11} & h_{12} \\ h_{21} & h_{22} \end{bmatrix}^* \begin{bmatrix} h_{11} & h_{12} \\ h_{21} & h_{22} \end{bmatrix} = Q \begin{bmatrix} \lambda_1 & \\ & \lambda_2 \end{bmatrix} Q^H \text{ wherein,}$$

H*H may describe the CSI matrix;
h—may describe the channel;
Q—may describe an eighen-channel matrix; and
λ—may described an eighen-value that may be equivalent to the SNR.

Although the scope of the present invention is not limited in this respect, in an exemplary n×m MIMO system, n may be the number of transmitters, m may be the number of receivers and the maximum dimension of CSI matrix H*H may be calculated according to the following equation: p=dim(H*H)<=min(n,m). In addition, the CSI matrix may support up to p spatial eighen-channels (e.g. orthogonal channels), for example, the CSI matrix may support up to p order of OFDM symbols in multiplexing mode, if desired. In addition, the ability of transmitter system 240 to operate in multiplexing mode may be tested by choosing the number of eighen-channels that support the sensitivity required for transmitting in multiplexing mode.

Although the scope of the present invention is not limited in this respect, CSI analyzer 255 may analyze the CSI and may command mode selector 270 to select the desired coding method, for example, diversity method, multiplexing method or the like. In some embodiments, CSI analyzer 255 may provide indication to switch 274 to select the multiplexing mode, if k,mux OFDM sub-carrier symbols may support p,min multiplexing order. In those embodiments, the sub-carrier symbols that support the p,min multiplexing order may be transmitted in the multiplexing mode and the other sub-carriers symbols may be transmitted in diversity mode. In embodiments of the invention, a single bit may be used to switch between the modes. For example, "1" may indicate to switch transmitter system 240 to multiplexing mode and "0"

may indicate to switch transmitter system 240 to diversity mode, although the scope of the invention is not limited in this respect.

Although the scope of the present invention is not limited in this respect, IFFT TX 246 may transmit OFDM sub-carrier symbols $S_1$ via antenna 220 and IFFT TX 248 may transmit the OFDM sub carrier symbols either in diversity mode and/or in multiplexing mode (e.g. $S_2$) via antenna 230. Although the scope of the present invention is not limited in this respect, antenna 220 and/or antenna 230 may include an internal antenna, or an omni-directional antenna, or a monopole antenna, or a dipole antenna, or an end fed antenna or a circularly polarized antenna, or a micro-strip antenna, or a diversity antenna, a dual antenna, an antenna array or the like.

Although the scope of the present invention is not limited in this respect, in another embodiment of the invention, transmitter system 240 may transmit coding grouping information (CGI) to a receiver of other station. For example, the CGI may include coding information that may be related to OFDM sub-carrier (k). For example, CGI may include a single bit (e.g. "1"=multiplexing mode, "0"=diversity mode) that may be described by the decoding mechanism.

Although the scope of the present invention is not limited in this respect, for example, in a receiver of MIMO system OFDM sub-carriers symbols may be grouped into at least two sub-modes, according to the transmitter decoding information. In some embodiments of the invention, the "1's" sub-carriers may be decoded according to multiplexing code decoding scheme such as, for example Minimum Mean Squared Error (MMSE) or the like and "0's" sub-carriers may be decoded according to diversity coding schemes such as, for example, maximal ratio combining (MRC) or the like.

In embodiments of the invention, a feedback data packet may be sent from a receiving station to a transmitting station. The feedback data packet may include control bits such as, for example, the CGI that may include the coding information of the OFDM sub-carrier symbol. In some embodiments of the invention, in order to decrease the number of CGI bits in the feedback packet, the OFDM sub-carrier symbols may be divided into predefined sub-groups wherein, a single CGI bit may be dedicated to a sub-group and/or to a number of sub-groups, if desired. In those exemplary embodiments of the invention, the number of coding information bits may be proportional to the number of the predetermined sub-groups. For example, a group of 54 sub-carriers may be divided to two sub-groups of 27 sub-carriers, thus, the feedback data packet may include two CGI bits, if desired.

Although the scope of the present invention is not limited in this respect, transmitter system 240 may use a uniform modulation schema, for example 16QAM, 64QAM, or the like, with adaptive spatial multiplex, on the OFDM sub-carrier symbol.

Figure 3:
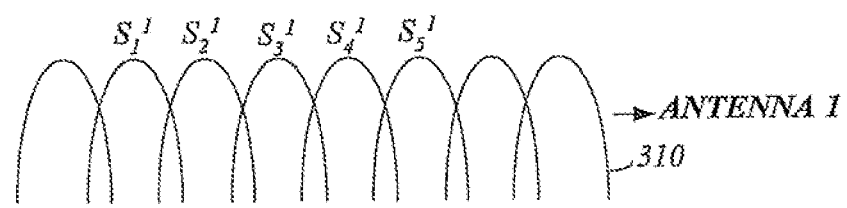
FIG. 3 is an illustration of OFDM sub-carrier symbols according to exemplary embodiments of the present invention.
Figure 3:
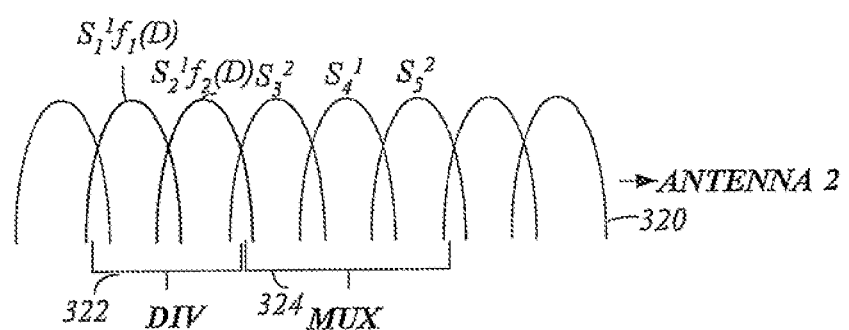

Turning to FIG. 3, an illustration of OFDM sub-carrier symbols according to exemplary embodiments of the present invention is shown. Although the scope of the present invention is not limited in this respect, OFDM sub carriers 310 symbols, for example, $S_1^1, S_2^1, S_3^1, S_4^1, S_5^1$ may be transmitted via a first antenna (e.g. antenna 220). In some embodiments of the invention, OFDM sub carriers 320 symbols may be transmitted via a second antenna (e.g. antenna 230). For example, OFDM sub carrier symbols 320 may be divided into two groups. The first group, group 322, may include OFDM sub carriers symbols $S_1^1 f_1(D)$ and $S_2^1 f_2(D)$ that may be transmitted in diversity (DIV) mode. It should be understood that $S_1^1$ may represent a first symbol of group 1 and $f_1(D)$ may represent a delay (D) function of group 1, if desired. For example, the delay function $f_1(D)$ may be $f_1^{-j2\pi f_1 d}$. The second group, group 324 may include for example, OFDM sub carriers symbols $S_3^2, S_4^1, S_5^2$ that may be transmitted in multiplexing (MUX) mode, although the scope of the present invention is not limited in this respect.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A wireless communication station for communicating with mobile devices in a cellular network using multiple-access technique, the station comprising:
    a receiver to receive indicators from a mobile device including an indicator of channel state;
    an encoder to encode a data stream into an encoded data stream at least based in part on the indicator of channel state;
    one or more mappers to map the encoded stream onto an orthogonal frequency division multiplexing (OFDM) subcarrier symbol stream based at least in part on the indicator of channel state, the indicator of channel state comprising an indicator of channel state for each group of OFDM subcarriers;
    a coding mode selector to receive the OFDM subcarrier symbol stream and to configure a coding mode for transmission of non-control information on a shared channel in accordance with both a diversity mode and a non-diversity mode, the non-diversity mode including a spatial multiplexing mode; and
    a transmitter to transmit a control channel, separate from the shared channel, the control channel including control information to the mobile device that indicates at least the selected transmission mode of a plurality of transmission modes used for the transmission of the non-control information on the shared channel,
    wherein the coding mode selector is arranged to select both transmission modes for groups of OFDM subcarriers and is configurable to switch between the transmission modes to allow the transmitter to transmit some symbols of a group of OFDM subcarriers in accordance with the diversity mode and configurable to transmit some other symbols of the group of OFDM subcarriers in accordance with the non-diversity mode.

2. The wireless communication station of claim 1 further comprising at least two antennas coupled to the communication station for at least one of multiple-input or multiple-output (MIMO) communications,
    wherein the diversity mode includes providing some symbols with delay.

3. The wireless communication station of claim 2 wherein the encoder comprises a convolution code encoder.

4. The wireless communication station of claim 2 wherein the encoder comprises a Turbo encoder.

5. The wireless communication station of claim 2 further comprising one or more inverse Fourier Transform (IFFT) transmission modules coupled to the coding mode selector to perform an IFFT on groups of subcarriers,
    wherein the indicator of channel state comprises a channel quality indicator for a group of subcarriers.

6. The wireless communication device of claim 2 wherein during the diversity mode same data is transmitted through two spatial channels using at least two antennas, and wherein during the spatial multiplexing mode, different data is received through each spatial channel of a plurality of two or more spatial channels using at least two antennas.

7. A mobile communication device comprising:
a multiple-input, multiple output (MIMO) transceiver to couple with two or more antennas for transmitting and receiving orthogonal frequency division multiplexed (OFDM) signals in accordance with a multiple access technique; and
processing circuitry to configure the transceiver at least for reporting an indicator of channel state,
wherein the transceiver is to receive a control channel comprising control information indicating a transmission of a shared channel in accordance with a diversity mode and a non-diversity mode of a plurality of transmission modes, the transmission modes being selected by a wireless communication station, the non-diversity mode including a multiplexing mode,
wherein the transceiver is further configured for receiving the shared channel comprising non-control information in accordance with the transmission modes indicated by the control information,
wherein the processing circuitry is arranged to configure the transceiver to receive symbols in accordance with both the diversity mode and the non-diversity mode and to switch between the transmission modes to configure the transceiver to receive some symbols of a group of OFDM subcarriers in accordance with the diversity mode and configure the transceiver to receive some other symbols of the group of OFDM subcarriers in accordance with the non-diversity mode,
wherein the control channel is separate from the shared channel.

8. The mobile communication device of claim 7 wherein the processing circuitry includes a coding mode selector is to cause the transceiver to switch between transmission modes based on the control information.

9. The mobile communication device of claim 7 wherein during the diversity mode same data is received through two spatial channels, the diversity mode including receiving some symbols with delay, and
wherein during the spatial multiplexing mode, different data is received through each spatial channel of a plurality of two or more spatial channels.

10. The mobile communication device of claim 9 wherein the spatial multiplexing mode includes a closed-loop spatial multiplexing mode and an open-loop spatial multiplexing mode,
wherein the non-control information received on the shared channel is received in accordance with either the closed-loop spatial multiplexing mode or the open-loop spatial multiplexing mode, and
wherein during the closed-loop spatial multiplexing mode, the non-control information of the shared channel is configured, at least in part, based on feedback that includes the indicator of channel state.

11. The mobile communication device of claim 9 wherein modulation and coding of the non-control information of the shared channel is based, at least in part, on the indicator of channel state.

12. The mobile communication device of claim 9 wherein the plurality of transmission modes further includes a single-antenna mode,
wherein when the control information indicates a single-antenna mode, the processing circuitry is to configure the transceiver for receipt of the information of the shared channel using one of the antennas.

13. The mobile communication device of claim 12 wherein the indicator of channel state comprises feedback that indicates channel quality information for a group of a predetermined number subcarriers.

14. The mobile communication device of claim 13 further comprising IFFT circuitry to perform an Inverse Fast Fourier Transform (IFFT) on a group of the predetermined number of subcarriers.

15. A method performed by a mobile communication device comprising:
transmitting and receiving orthogonal frequency division multiplexed (OFDM) signals in accordance with a multiple access technique with a multiple-input, multiple output (MIMO) transceiver coupled with two or more antennas;
reporting an indicator of channel state;
receiving a control channel comprising control information indicating a transmission of a shared channel in accordance with a diversity mode and a non-diversity mode of a plurality of transmission modes, the transmission mode being selected by a wireless communication station, the non-diversity mode including a multiplexing mode;
receiving the shared channel comprising non-control information in accordance with the transmission modes indicated by the control information; and
configuring a transceiver to receive symbols in accordance with both the diversity mode and the non-diversity mode and to switch between the transmission modes to configure the transceiver to receive some symbols of a group of OFDM subcarriers in accordance with the diversity mode and configure the transceiver to receive some other symbols of the group of OFDM subcarriers in accordance with the non-diversity mode,
wherein the control channel is separate from the shared channel.

16. The method of claim 15 further comprising causing the transceiver to switch between transmission modes based on the control information.

17. The method of claim 15 wherein during the diversity mode same data is received through two spatial channels, the diversity mode including receiving some symbols with delay, and
wherein during the spatial multiplexing mode, different data is received through each spatial channel of a plurality of two or more spatial channels.

18. The method of claim 17 wherein the spatial multiplexing mode includes a closed-loop spatial multiplexing mode and an open-loop spatial multiplexing mode,
wherein the non-control information received on the shared channel is received in accordance with either the closed-loop spatial multiplexing mode or the open-loop spatial multiplexing mode, and
wherein during the closed-loop spatial multiplexing mode, the non-control information of the shared channel is configured, at least in part, based on feedback that includes the indicator of channel state.

19. The method of claim 17 wherein modulation and coding of the non-control information of the shared channel is based, at least in part, on the indicator of channel state.

20. The method of claim 17 wherein the plurality of transmission modes further includes a single-antenna mode,
wherein when the control information indicates a single-antenna mode, the processing circuitry is to configure the transceiver for receipt of the information of the shared channel using one of the antennas.

21. The method of claim 20 wherein the indicator of channel state comprises feedback that indicates channel quality information for a group of a predetermined number subcarriers.

22. The method of claim 21 further comprising performing an Inverse Fast Fourier Transform (IFFT) on a group of the predetermined number of subcarriers.

* * * * *

UNITED STATES PATENT AND TRADEMARK OFFICE
CERTIFICATE OF CORRECTION

| | |
|---|---|
| PATENT NO. | : 8,755,452 B2 |
| APPLICATION NO. | : 13/089043 |
| DATED | : June 17, 2014 |
| INVENTOR(S) | : Shmuel Levy |

It is certified that error appears in the above-identified patent and that said Letters Patent is hereby corrected as shown below:

In the Claims

Column 7, line 33, in Claim 7, after "mode,", insert --and--, therefor

Signed and Sealed this
Twenty-fifth Day of November, 2014

Michelle K. Lee
*Deputy Director of the United States Patent and Trademark Office*